Patented Oct. 22, 1946

2,409,678

UNITED STATES PATENT OFFICE 2,409,678

PREPARATION OF SOAPS

Clement Hutton Hamblet, Gordon Heights, Del., assignor to E. I. du Pont de Nemours & Company, Wilmington, Del., a corporation of Delaware No Drawing. Application September 18, 1943, Serial No. 502,991

9 Claims. (Cl. 260—414)

This invention relates to a process for the preparation of metallic salts of organic acids and more particularly to the preparation of metal soaps of the fatty acids.

Various methods have been proposed for the preparation of the metallic salts of the organic acids such, for example, as the reaction of the organic acid with a heavy metal carbonate or by the exposure of the metal to the warm vapors of the organic acids, the latter procedure being employed for the preparation of white lead, requiring many days and in some cases weeks in processing. These slow and tedious processes are unsuitable for rapid economical formation of the heavy metal salts of organic acids.

More rapid methods of preparing the salts are described in the copending applications of A. G. Weber and C. H. Hamblet, Serial Nos. 503,268 and 505,214, wherein they are prepared by the reaction of organic acids or their esters with metals in the presence of oxygen. In these processes, however, the products are often degraded due presumably to the decomposition or breakdown of the acid during the reaction.

An object of the present invention is to provide a process for the preparation of undegraded metal salts of organic acids and their esters. Another object of the invention is to provide a process wherein organic acids and their derivatives can be converted to the corresponding metal salt by direct contact with a metal whereby degradation of the organic portion of the salt is inhibited. A further object of the invention is to provide a process for the preparation of metal salts of organic acids containing unsaturation and more particularly the salts of the unsaturated fatty acids whereby there is no degradation of the acid portion of the salt during the conversion. Other objects and advantages of the invention will hereinafter appear.

The above objects are accomplished in accord with the broadest aspects of the invention by a process wherein an organic acid or ester or mixtures thereof is heated with a heavy metal while in contact with oxygen and an antioxidant. More specifically, the process is conducted by passing an oxygen-containing gas such as air and an organic acid or ester thereof into a converter charged with metal pellets, the gas and organic reactant flowing cocurrent or countercurrent through the converter and degradation of the organic constituent being inhibited during the process by the presence throughout the reaction of an antioxidant.

The temperature of the reaction may vary through wide limits according to the nature of the organic constituent treated and the heavy metal used; when normally solid organic reactants are treated they should be heated at least to that temperature at which they are fluid in order that the oxygen or oxygen containing gas can be easily bubbled through them. Generally speaking, however, temperatures may range between 50 and 200° C. and more especially for the unsaturated fatty acids and their esters between 70 and 150° C. with a preferred range for the preparation of the lead soaps of the latter acids and esters between 100 and 120° C. atmospheric or superatmospheric pressures may be used.

The process of the invention is adapted to the preparation of the undegraded heavy metal salts of any organic acid, ester or mixtures thereof. Such salts can be made from the organic acids or their esters and as examples of such organic compounds that may be employed are included the following organic acids or esters of such acids as: the fatty acids; acetic, propionic, butyric, and more especially the long chain fatty acids such, for example, as caproic, lauric, palmitic, stearic, ricinoleic, melissic, and other members of the fatty acid series as well as the acids derived from coconut oil, corn oil, cottonseed oil, rapeseed oil and similar vegetable oils; hydroxy acids such, for example, as glycolic acid, lactic acid and tartaric acid; as well as polycarboxylic acids such, for example, as oxalic acid, glutaric acid and adipic acid; and the unsaturated acids such for example as acrylic acid and methacrylic acid, as well as the aromatic acids such, for example, as benzoic acid and napththenic acid.

Various esters of the above acids may be employed such, for example, as the methyl, ethyl, propyl, butyl and higher alkyl aryl or aralkyl esters or for that matter the glycerides of the above acids or the glycol esters. With respect to the glycerol and glycol esters these esters may be either mono or polyacid esters of the polyhydric alcohol.

The heavy metals that may be used include such metals as copper, cadmium, zinc, iron, nickel, silver, tin and especially lead although other salt forming metals may be reacted with the above compounds for the preparation of the corresponding acid salts.

The process may be carried out by a continuous or discontinuous procedure. The former may, for example, be illustrated by the use of a converter of considerably greater length than cross section disposed in a vertical position and charged with pellets of a metal which may be in the form of chips, flakes, or metal pellets of a suitable diameter such as, for example, from ⅛ to ½ inch. The organic acid or ester to be converted to the metal salt is introduced together with a suitable antioxidant into the converter together with an oxygen containing gas such as air and the reaction within the converter maintained at the optimum temperature for the particular type of acid or ester being converted to its salt. When esters are converted to their heavy metal salts water should likewise be introduced with the ester, the air or both. When carried out in this manner the acid or ester may be introduced at the top of the converter and the product collected from the bottom while air is permitted to bubble up through the descending acid or ester and the process thereby conducted under countercurrent flow conditions, the spent air being allowed to issue from the top of the converter carrying with it the water formed during the reaction. Contrariwise, both acid and air can be introduced into the bottom of the converter to give cocurrent flow, the product as well as the spent air and water formed issuing from the top of the converter. To enhance the flow of fluids within the converter a portion of the reactants may be pumped from the top of the converter and reintroduced into the bottom thereof, the velocity and turbulence of the flow within the converter being regulated in part by the amount and degree of this recycled material. As will be appreciated by those skilled in the art the recycling may be conducted in the reverse order that is by taking the product from the bottom and reintroducing it into the top of the converter and a further modification may be effected by removing the product from intermediate positions and returning it through intermediate positions to the converter. If desired, the throughput of acid or ester can be adjusted to the length of the converter in order that substantially all of the acid or ester is converted to its salt as it emerges from the converter.

The process may likewise be conducted batchwise which may be effected by charging a converter such as that described above or any suitable vessel with the metal particles, the anti-oxidant and the acid or ester to be reacted, the acid or ester is raised to reaction temperature and the reaction continued until all of the acid or ester has been converted to the salt whereupon it is discharged from the converter. Throughout the reaction air or oxygen or an oxygen containing gas is bubbled through or otherwise dispersed into the liquid. During batchwise processing it is likewise desirable to recirculate the reactants through the vessel which may be accomplished by an outside circuit provided with a suitable pump whereby the reactants are removed and returned to the vessel in order to maintain a constant, preferably turbulent, flow within the vessel.

For many purposes it is essential that the heavy metal salts and especially the heavy metal soaps of the long chain fatty acids such as the lead soaps be formed without degrading the organic portion thereof. For example, if such metal soaps are to be hydrogenated to alcohols for use as detergent intermediates the most valuable products are obtained only from the undegraded metal soaps. These soaps are obtained in accord with this invention by conducting the aforesaid reaction in the presence of an antioxidant. The evolution during the reaction of carbon dioxide indicates degradation of the acid or salt and it has been found that the presence of an antioxidant stops this evolution and inhibits and usually entirely eliminates degradation. Suitable examples of antioxidants which may be employed are:

Amino- or hydroxy-compounds:
    Para-hydroxydiphenyl phenols
    Hydroquinone
    Para-aminophenol
    p,p'-Diaminodiphenylmethane
    2,4-meta-toluylene diamine Secondary amines:
    Diphenylamine
    o- and p-Ditolylamines
    Phenyl-alpha-naphthylamine
    Phenyl-beta-napthylamine ("Neozone" D)
    Phenyl-beta-naphthylnitrosamine
    Symmetrical di-beta-napthyl-para-phenylenediamine ("Age-Rite White")
    Symmetrical diphenyldiamino-ethane
    2,4-diaminodiphenylamine Condensation products of amines with carbonyl compounds, e. g.
    Of aniline with acetaldehyde
    Of alpha-naphthylamine with aldol
    Of aniline with acetone, and
    Of diphenylamine with acetone.

Other antioxidants:
    Glycolic aldehyde
    Glyoxal
    Hydroxy aldehydes from the condensation of formaldehyde with itself and especially the hydroxyaldehydes so prepared
    Reducing sugars
    Amino acid esters such as tyrosine esters The examples which follow illustrate embodiments of the invention in which parts are by weight and to which the invention is not to be limited.

*Example 1.*—A stainless steel tower 10 feet high and with an internal diameter of 3⅞" was completely filled with lead fragments, obtained by passing molten lead through a 1/16" tube into water, except for a 4" space at the bottom of the tower which was packed with ¼" glass pellets supported on a perforated cone. Circulation of the products in the tower was provided from the top of the tower through a separator to the bottom. Into this tower 14,600 grams of coconut oil fatty acids were charged and air introduced at the bottom at the rate of 25.7 cubic feet per hour. The temperature of the reactants in the tower was maintained between 114 and 117° C. for approximately 6 hours. 92% of the acid charged was converted to the corresponding lead salt. Carbon dioxide evolution during the reaction corresponded to a degradation of approximately 1.03% of the acid charged.

Under substantially identical conditions (14,600 grams of coconut oil fatty acids, 26.8 cubic feet per hour air rate, temperature 112–116° C., and 6.25 hours duration) but with 1.46 grams of hydroquinone the same conversion to lead soap was attained. Degradation to $CO_2$ was less than 0.08% (the limit of precision of the analytical method employed).

*Example 2.*—The apparatus of Example 1 was charged with lead fragments obtained by passing molten lead through a 1/16" I. D. tube into water. 14,000 g. of coconut oil fatty acids containing 1.4 g. of hydroquinone were introduced and the reaction conducted at 115° C. with recirculation. In order to determine advantages derived from a variation of the air rate, the conditions were adjusted as follows:

Air rate, parts by volume per
 hour_____ 146    198    300
Time required to obtain 85%
 conversion_____  4.0    3.6    3.0

No detectable amounts of carbon dioxide were evolved during these reactions.

*Example 3.*—The apparatus described in Example 1 was charged with 1/8" lead spheres, and used for the conversion of coconut oil fatty acids to lead salts thereof with and without recirculation. In each instance 0.1% hydroquinone based on acid was used. The conditions employed were:

|  | No recirculation | Recirculation |
| --- | --- | --- |
| Weight of acid charged, g | 4,000 | 11,000 |
| Temperature, °C | 115 | 113 |
| Air rate, parts per hour | 111 | 163 |
| Production rate, lbs. per cu. ft. per hr | 2.81 | 4.53 |

The product obtained in both instances showed a 90% conversion without degradation.

*Example 4.*—A glass tower 1.9 centimeters inside diameter was filled to a height of 191 centimeters with lead fragments obtained by panning molten lead through a 3 mm. screen into water. No circulation was provided with this tower such as was used in the apparatus of Example 1. 320 grams of oleic acid was charged into the tower and air bubbled up through the tower from the bottom at a rate of 0.43 cubic feet per hour. The tower and contents were held at a temperature of approximately 80° C. and the reaction continued for approximately 4.2 hours. 55% conversion of the oleic acid to its lead salt was obtained. Carbon dioxide evolution corresponded to a degradation of approximately 0.6% of the acid charged. The degradation increased at a faster rate than the conversion.

The above process was conducted under substantially identical conditions (361 grams of oleic acid, air rate 0.43 cubic feet per hour, temperature 70 to 100° C., time 4 hours) but with 0.4 gram of hydroquinone. A conversion of approximately 65% of the oleic acid to lead oleate was obtained. During this reaction there was no carbon dioxide evolution even at temperatures in the neighborhood of 100° C.

As shown by the examples, the rate of air flow may be varied and it has been found that this variation may range between a space velocity of 10 and 100, space velocity being defined as the unit volume of air passing per hour per superficial volume occupied by the metal particles in the tower, the fluid volumes being determined under standard temperature and pressure conditions. While the examples have described the use of air, other inert gas-oxygen mixtures may be employed or for that matter pure oxygen may be used.

I claim:

1. In a process for the preparation of heavy metal salts of an organic acid, the step which comprises reacting a heavy metal with a compound selected from the group consisting of organic acids containing unsaturation and at least 8 carbon atoms and their esters in the presence of oxygen and an antioxidant selected from the group consisting of para-hydroxydiphenyl phenols, hydroquinone, para-aminophenol, p,p'-diaminodiphenylmethane, 2,4-meta-toluylene diamine, diphenylamine, o- and p-ditolylamines, phenyl - alpha - naphthylamine, phenyl - beta - naphthylnitrosamine, symmetrical di-beta-naphthyl-para - phenylenediamine, symmetrical diphenyldiaminoethane, 2,4 - diaminodiphenylamine, condensation products of aniline with acetaldehyde, of alphanaphthylamine with aldol, of aniline with acetone, and of diphenylamine with acetone; the antioxidant being present in sufficient amounts to prevent the formation of $CO_2$ during the reaction.

2. In a process for the preparation of a heavy metal salt of an unsaturated organic acid, the step which comprises conducting the reaction at a temperature between 50 and 200° C. between a heavy metal and an unsaturated organic acid containing at least 8 carbon atoms in the presence of oxygen and an antioxidant selected from the group consisting of para-hydroxydiphenyl phenols, hydroquinone, para-aminophenol, p,p'-diaminodiphenylmethane, 2,4-meta-toluylene diamine, diphenylamine, o- and p-ditolylamines, phenyl - alpha - naphthylamine, phenyl - beta - naphthylnitrosamine, symmetrical di-beta-naphthyl-para-phenylenediamine, symmetrical diphenyldiaminoethane, 2, 4 - diaminodiphenylamine, condensation products of aniline with acetaldehyde, of alpha-naphthylamine with aldol, of aniline with acetone, and of diphenylamine with acetone; the antioxidant being present in sufficient amounts to prevent the formation of $CO_2$ during the reaction there being present sufficient amounts of the antioxidant to prevent the formation of $CO_2$ during the reaction.

3. In a process for the preparation of a heavy metal salt of a long chain fatty acid containing unsaturation, the step which comprises conducting the reaction at a temperature between 50 and 200° C. between a heavy metal and a long chain fatty acid ester containing unsaturation and at least 8 carbon atoms in the presence of oxygen and an antioxidant selected from the group consisting of para-hydroxydiphenyl phenols, hydroquinone, para-aminophenol, p,p'-diaminodiphenylmethane, 2,4-meta-toluylene diamine, diphenylamine, o- and p-ditolylamines, phenyl-alpha-naphthylamine, phenyl - beta - naphthylnitrosamine, symmetrical di-beta-naphthyl-para-phenylenediamine, symmetrical diphenyldiaminoethane, 2,4 - diaminodiphenylamine, condensation products of aniline with acetaldehyde, of alpha-naphthylamine with aldol, of aniline with acetone, and of diphenylamine with acetone; the antioxidant being present in sufficient amounts to prevent the formation of $CO_2$ during the reaction there being present sufficient amounts of the antioxidant to prevent the formation of $CO_2$ during the reaction.

4. In a process for the preparation of a heavy metal soap of a vegetable oil acid, the step which comprises conducting the reaction at a temperature between 50 and 200° C. between a heavy metal and a vegetable oil in the presence of air and an antioxidant selected from the group consisting of para-hydroxydiphenyl phenols, hydroquinone, para - aminophenol, p,p' - diaminodiphenylmethane, 2,4-meta-toluylene diamine, diphenylamine, o- and p-ditolylamines, phenyl-alpha-naphthylamine, phenyl - beta - naphthylnitrosamine, symmetrical di-beta-naphthyl-para-phenylenediamine, symmetrical diphenyldiaminoethane, 2,4-diaminodiphenylamine, condensation products of aniline with acetaldehyde, of alpha-naphthylamine with aldol, of aniline with acetone, and of diphenylamine with acetone; the antioxidant being present in sufficient amounts to prevent the formation of $CO_2$ during the reaction there being present sufficient amounts of the antioxidant to prevent the formation of $CO_2$ during the reaction.

5. In a process for the preparation of lead salts of the vegetable oil acids the step which comprises conducting the reaction between a vegetable oil and metallic lead in the presence of oxygen and hydroquinone at a temperature between 50 and 200° C. there being present a sufficient amount of hydroquinone to prevent the formation of $CO_2$ during the reaction.

6. In a process for the preparation of lead salts of the unsaturated fatty acids the step which comprises conducting the reaction between an unsaturated fatty acid ester containing at least 8 carbon atoms and metallic lead in the presence of oxygen and hydroquinone at a temperature between 50 and 200° C. there being present a sufficient amount of hydroquinone to prevent the formation of $CO_2$ during the reaction.

7. In a process for the preparation of a lead soap of coconut oil acids the step which comprises conducting the reaction between metallic lead and coconut oil in the presence of oxygen and inhibiting degradation during the reaction by the presence of hydroquinone there being present a sufficient amount of hydroquinone to prevent the formation of $CO_2$ during the reaction.

8. In a process for the preparation of lead oleate, the step which comprises reacting metallic lead with oleic acid in the presence of air and inhibiting the degradation during the reaction by the presence of hydroquinone there being present a sufficient amount of hydroquinone to prevent the formation of $CO_2$ during the reaction.

9. In a process for the preparation of heavy metal salts of organic acids containing unsaturation and at least 8 carbon atoms, the step which comprises reacting a heavy metal with a compound selected from the group consisting of organic acids containing unsaturation and at least 8 carbon atoms and their esters in the presence of oxygen and a sufficient amount of an antioxidant selected from the group consisting of para-hydroxydiphenyl phenols, hydroquinone, para-aminophenol, p,p'-diaminodiphenylmethane, 2,4-meta-toluylene diamine, diphenylamine, o- and p-ditolylamines, phenyl - alpha-naphthylamine, phenyl-beta - naphthylnitrosamine, symmetrical di-beta-naphthyl-para-phenylenediamine, symmetrical diphenyldiaminoethane, 2,4-diaminodiphenylamine, condensation products of aniline with acetaldehyde, of alpha-naphthylamine with aldol, of aniline with acetone, and of diphenylamine with acetone; the antioxidant being present in sufficient amounts to prevent the formation of $CO_2$ during the reaction.

CLEMENT HUTTON HAMBLET.